WILLIAM H. VAN CLEVE.

Improvement in Lock Washers.

No. 124,644.                                Patented March 12, 1872.

Witnesses
O. H. Poole
John R. Young

Inventor.
Wm H. Van Cleve, by
Prindle and Dyer, his
Attys.

124,644

UNITED STATES PATENT OFFICE.

WILLIAM H. VAN CLEVE, OF YPSILANTI, MICHIGAN.

IMPROVEMENT IN LOCK-WASHERS.

Specification forming part of Letters Patent No. 124,644, dated March 12, 1872.

*To all whom it may concern:*

Be it known that I, WILLIAM H. VAN CLEVE, of Ypsilanti, in the county of Washtenaw and in the State of Michigan, have invented certain new and useful Improvements in Nut-Lock Washers; and do hereby declare that the following is a full, clear, and exact description thereof, reference being had to the accompanying drawing making a part of this specification in which—

Figure 1:
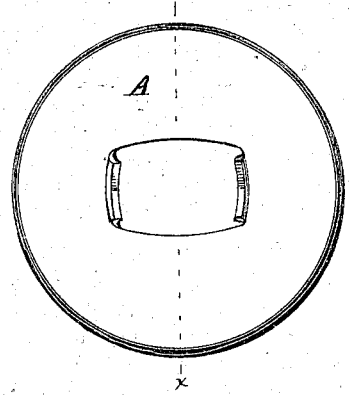
Figure 3:
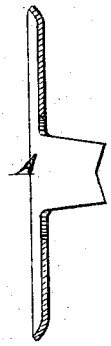
Figure 2:
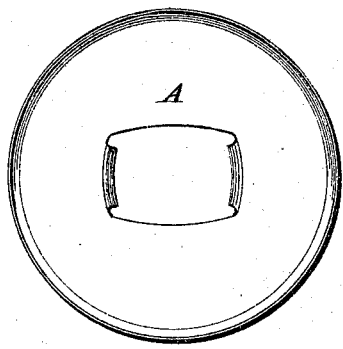
Figure 4:
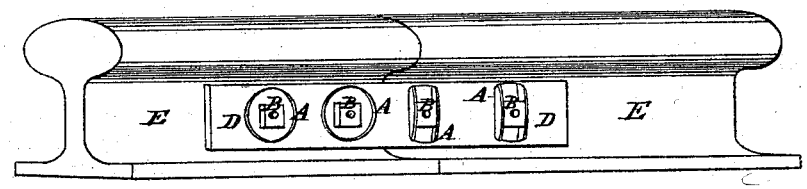
Figure 5:
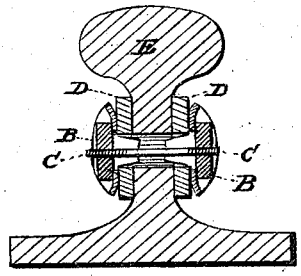

Figures 1 and 2 are elevations of the inner and outer sides, respectively, of a lock-nut washer containing my improvement. Fig. 3 is a vertical central section of the same. Fig. 4 shows said washer as applied to a railway fish-bar joint, and Fig. 5 is a cross-section of said joint at the center of one of said washers.

Letters of like name and kind refer to like parts in each of the figures.

My invention is an improvement in a class of devices used for locking nuts or bolt-heads in position, by securing beneath the same a piece of sheet metal, and bending one of its edges upward against one side of said nut or head; and it consists in giving to the edge of the sheet-metal washer a slight outward curve, substantially as and for the purpose hereinafter specified.

In the class of nut-locks to which my invention is applicable the inner face of the washer is plane, and when in position fits closely down upon its seat, and renders necessary the employment of a cold-chisel having an extremely thin and sharp edge, in order that the edge of the washer may be turned outward against the side of the nut. In practice it is found that a chisel thus adapted to use is so liable to break as to materially add to the labor and expense attendant upon the employment of the washers. To obviate these difficulties I give to the outer edge of the washer a slight outward curve, so as to furnish between the same and the bearing beneath a space sufficient to permit the insertion of an ordinary blunt-edged chisel, by which means the liability to breakage of said chisel is largely decreased, while the operation of locking the nuts in place is greatly facilitated.

For convenience of illustration I have shown but one form of washer, A, as applied to the nuts B of bolts C, which pass through the ordinary fish-bars or plates D used for connecting together the ends of two rails, E; but it will be seen that the invention is equally applicable to any form of washer used for locking nuts by having its edge turned outward against one of the sides of the latter.

Having thus fully set forth the nature and merits of my invention, what I claim as new is—

A sheet-metal washer, used for locking in position a nut or bolt-head by being secured beneath the same and having its edge turned outward against the side of said nut or head, when the edge of said washer is curved outward, substantially as and for the purpose specified.

In testimony that I claim the foregoing I have hereunto set my hand this 29th day of September, 1871.

WILLIAM H. VAN CLEVE.

Witnesses:
 GEO. S. PRINDLE,
 JOHN R. YOUNG.